US012788178B2

(12) United States Patent
de Geus et al.

(10) Patent No.: US 12,788,178 B2
(45) Date of Patent: Nov. 10, 2026

(54) OIL-IMPREGNATED WIPE AND METHOD FOR SEASONING CAST IRON AND CARBON STEEL COOKWARE

(71) Applicants: Jordan Tyler de Geus, Mercer Island, WA (US); Blaire Lauren Burstein, Mercer Island, WA (US)

(72) Inventors: Jordan Tyler de Geus, Mercer Island, WA (US); Blaire Lauren Burstein, Mercer Island, WA (US)

( * ) Notice: Subject to any disclaimer, the term of this patent is extended or adjusted under 35 U.S.C. 154(b) by 0 days.

(21) Appl. No.: 19/274,245

(22) Filed: Jul. 18, 2025

(65) Prior Publication Data

US 2025/0344900 A1 Nov. 13, 2025

Related U.S. Application Data

(63) Continuation-in-part of application No. 18/443,507, filed on Feb. 16, 2024, now Pat. No. 12,004,682.

(51) Int. Cl.

*A47J 36/02* (2006.01)
*A47L 17/08* (2006.01)
*B05D 5/08* (2006.01)

(52) U.S. Cl.

CPC .............. *A47J 36/025* (2013.01); *B05D 5/08* (2013.01); *A47L 17/08* (2013.01)

(58) Field of Classification Search

CPC ........... A47J 36/025; A47J 36/00; B05D 5/08; B05D 5/00; B05D 5/083; A47L 17/08

USPC ............................... 401/196, 216; 15/104.93

See application file for complete search history.

(56) References Cited

U.S. PATENT DOCUMENTS

| | | | |
|---|---|---|---|
| 6,916,382 B1 | 7/2005 | Aldredge | |
| 12,004,682 B1 | 6/2024 | de Geus et al. | |
| 2005/0207820 A1 * | 9/2005 | Franczak | A47L 13/34 401/39 |
| 2024/0268429 A1 | 8/2024 | Shapiro | |

* cited by examiner

*Primary Examiner* — David J Walczak

(74) *Attorney, Agent, or Firm* — Carson Patents; Gregory D Carson

(57) ABSTRACT

The cookware seasoning wipe for seasoning cast iron and carbon steel cookware is composed of natural or synthetic fibers and is impregnated exclusively with a food-grade oil, optionally including essential oils for scent. Free from wax or wax derivatives, the wipe is designed to distribute oil uniformly and enable polymerization when the cookware is heated between approximately 120° C. and 350° C. The invention simplifies the seasoning process, reduces mess, and provides consistent, non-stick performance. Variations include biodegradable or recyclable materials, textured surfaces, microencapsulated oil, indicator elements, and tailored oil blends. The method for seasoning cast iron and carbon steel cookware includes applying the wipe, heating the cookware, and allowing it to cool, optionally repeating for layered seasoning. The invention enhances user control, cleanliness, portability, and sustainability in cookware maintenance.

20 Claims, 3 Drawing Sheets

OIL-IMPREGNATED WIPE AND METHOD FOR SEASONING CAST IRON AND CARBON STEEL COOKWARE

REFERENCE TO RELATED PATENTS

This application is related to U.S. Pat. No. 12,004,682 B1 by the same inventors.

BACKGROUND OF THE INVENTION

Technical Field

This invention relates generally to a cookware seasoning product. This invention relates more particularly to an apparatus/device for seasoning cast iron and carbon steel cookware.

This invention relates generally to apparatuses and devices for seasoning cookware. This method also can be used with carbon steel and cast iron cookware.

This invention relates more particularly to a wipe impregnated exclusively with food-grade oils to season cookware surfaces by polymerization.

The present invention pertains to the field of culinary utensils, particularly cookware maintenance devices. Specifically, it involves wipes impregnated with food-grade oils, configured for application onto cookware surfaces such as cast iron or carbon steel. The invention aims to provide an efficient method for creating durable, non-stick polymerized oil layers that enhance cookware performance and longevity. The invention falls under U.S. patent classifications relating to kitchenware maintenance apparatuses and processes, particularly those involving surface coating or polymerization treatment of cookware.

Background Art

Cookware seasoning has traditionally involved the manual application of liquid oils, often by pouring or brushing oil onto the cookware surface, followed by heating to induce polymerization. While effective under optimal conditions, this approach can be messy and prone to inconsistency due to over- or under-application of oil, uneven coverage, and dripping. Such inconsistencies can result in poor seasoning outcomes, including sticky residues, inadequate non-stick properties, and degraded cookware performance over time.

Some users attempt to mitigate these issues by repurposing household paper towels or cloths to spread the oil, but these materials are not optimized for consistent oil retention, release, or heat resistance. Furthermore, the absorption and subsequent uneven release of oil from these makeshift applicators can interfere with uniform polymerization, particularly at high temperatures. Additionally, these materials are often not food-safe for high-temperature use or sustainable from an environmental standpoint.

Other commercially available products may include waxes or synthetic coatings to enhance performance, but such additives can complicate the seasoning process, leave undesirable residues, or introduce potential food safety concerns. Users seeking natural or minimal-ingredient solutions may find current options lacking in safety, effectiveness, and convenience.

In light of the foregoing prior art, there is a need for a dedicated, food-safe, oil-impregnated wipe to better facilitate consistent, clean, and effective seasoning of cast iron and carbon steel cookware surfaces.

BRIEF SUMMARY OF THE INVENTION

According to a first aspect of the invention, there is a cookware seasoning wipe comprising a wipe composed of natural or synthetic fibers, having a surface area of at least eight square centimeters, and impregnated exclusively with a food-grade oil. The food-grade oil may be optionally combined with essential oils for scent and is free from wax or wax derivatives. The oil is distributed either throughout the wipe or across a substrate of the wipe. The wipe is specifically configured for seasoning cast iron or carbon steel cookware surfaces by polymerization of the oil onto the cookware when heated between approximately 120° C. and 350° C.

According to a second aspect of the invention, there is a method for seasoning cast iron or carbon steel cookware surfaces comprising rubbing a food-grade oil-impregnated wipe onto the cookware surface, heating the cookware to a temperature sufficient to polymerize the oil onto the surface, and allowing the cookware to cool. The process uses exclusively oil-impregnated wipes that contain no wax or wax derivatives. This method creates a durable, non-stick layer through controlled polymerization and can be repeated or layered as needed.

Further features of the invention are disclosed in dependent aspects as follows: According to a third aspect of the invention, there is a cookware seasoning wipe in the form of a biodegradable or compostable wipe for environmentally responsible disposal. An advantage of the biodegradable wipe is its reduced environmental impact and ease of disposal after single or multiple uses.

According to a fourth aspect of the invention, there is a cookware seasoning wipe in the form of a recyclable object for seasoning cookware. An advantage of the recyclable wipe is its sustainability and compatibility with environmentally conscious practices.

According to a fifth aspect of the invention, there is a cookware seasoning wipe in the form of a container-sealed, single-use product for maintaining wipe freshness and usability. An advantage of this object is its convenience, portability, and preservation of oil quality over time.

According to a sixth aspect of the invention, there is a cookware seasoning wipe in the form of a wipe with microencapsulated oil that releases upon heat or pressure. An advantage of this wipe is the controlled and efficient release of oil precisely during seasoning.

According to a seventh aspect of the invention, there is a method wherein heating may be performed in an oven or on a stovetop burner to accommodate various user preferences or kitchen setups. An advantage of this method is its flexibility and adaptability to different cooking environments.

According to an eighth aspect of the invention, there is a wipe designed with a textured surface for even oil distribution during application. An advantage of this surface structure is the enhanced control and consistency of seasoning across cookware surfaces.

According to a ninth aspect of the invention, there is a wipe containing an indicator element that visually signals the complete release of oil when activated by heat. An advantage of this feature is the improved user feedback and assurance of effective seasoning.

According to a tenth aspect of the invention, there is a method for applying multiple wipes sequentially to build seasoning layers, enhancing the durability and effectiveness of the coating.

The present invention offers several advantages over the prior art. It simplifies the seasoning process, reduces mess, provides consistent and uniform oil distribution, and ensures effective polymerization of the oil layer. The wipe format offers a convenient, ready-to-use solution that eliminates guesswork, accommodates sustainable practices, and enhances the performance and longevity of cookware through reliable seasoning results.

The invention will now be described, by way of example only, with reference to the accompanying drawings in which:

DETAILED DESCRIPTION OF THE INVENTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Index of Labelled Features in Figures. Features are listed in numeric order by Figure in numeric order.

Figure 1:
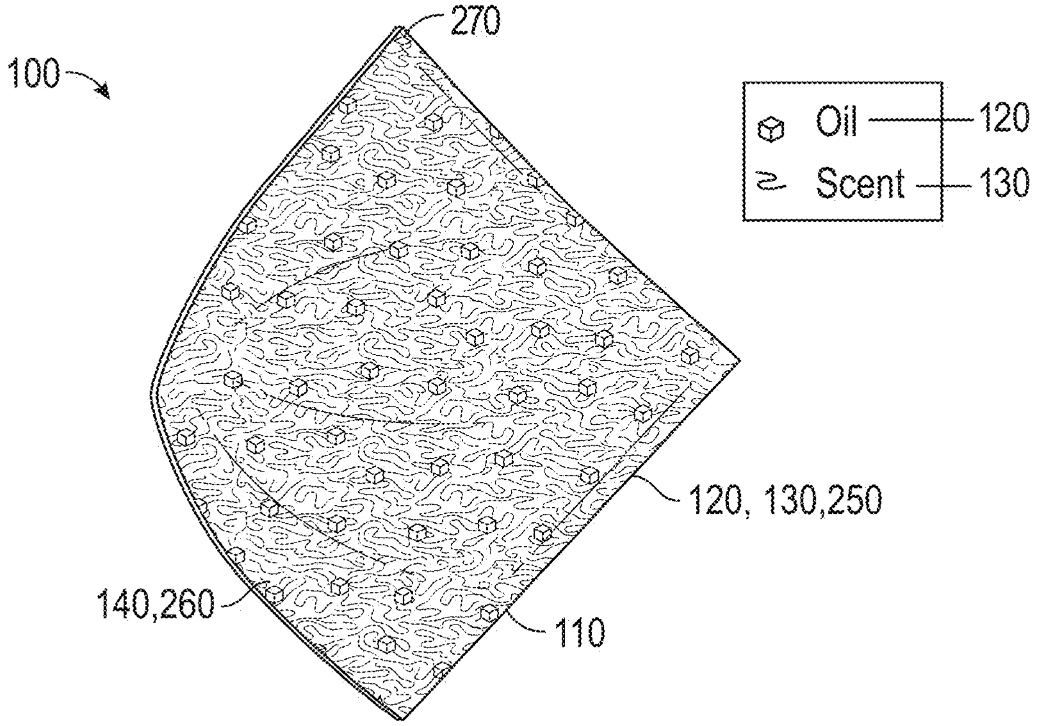
FIG. 1 is a top view of the oil-impregnated wipe and method for seasoning cast iron and carbon steel cookware according to the invention.
Figure 2:
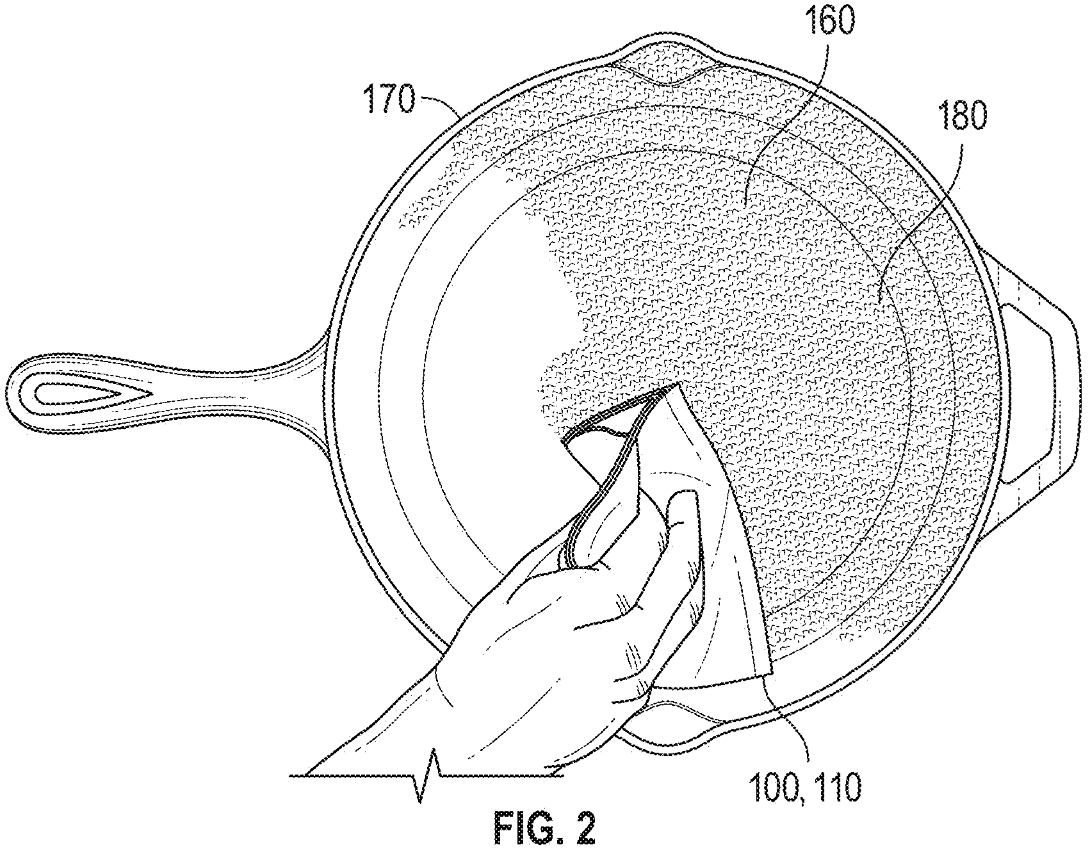
FIG. 2 is a top view of the oil-impregnated wipe and method for seasoning cast iron and carbon steel cookware according to the invention.
Figure 3:
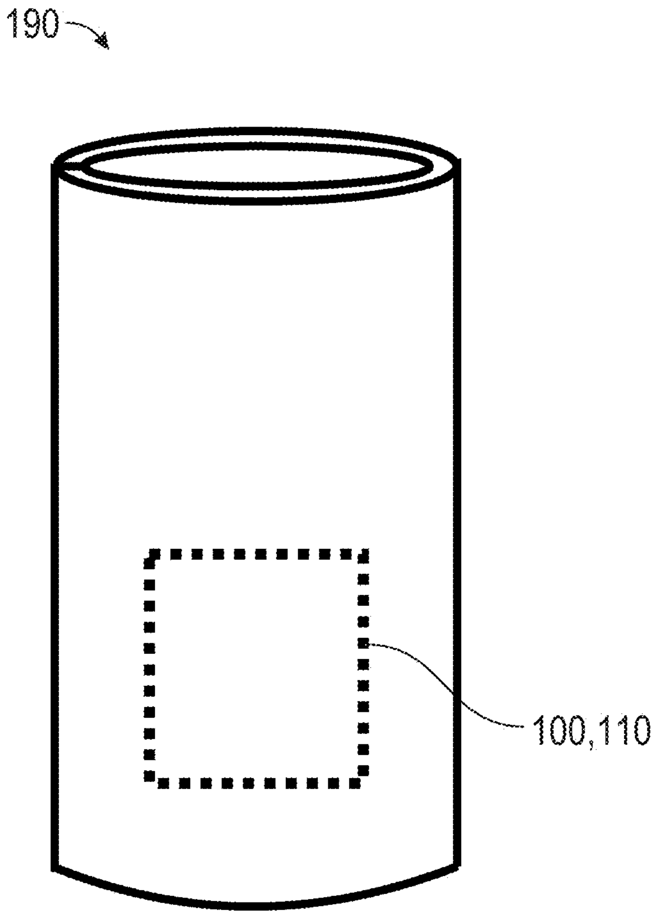
FIG. 3 is a front perspective view of the air-tight, single-use container of the oil-impregnated wipe and method for seasoning cast iron and carbon steel cookware according to the invention.
Figure 4:
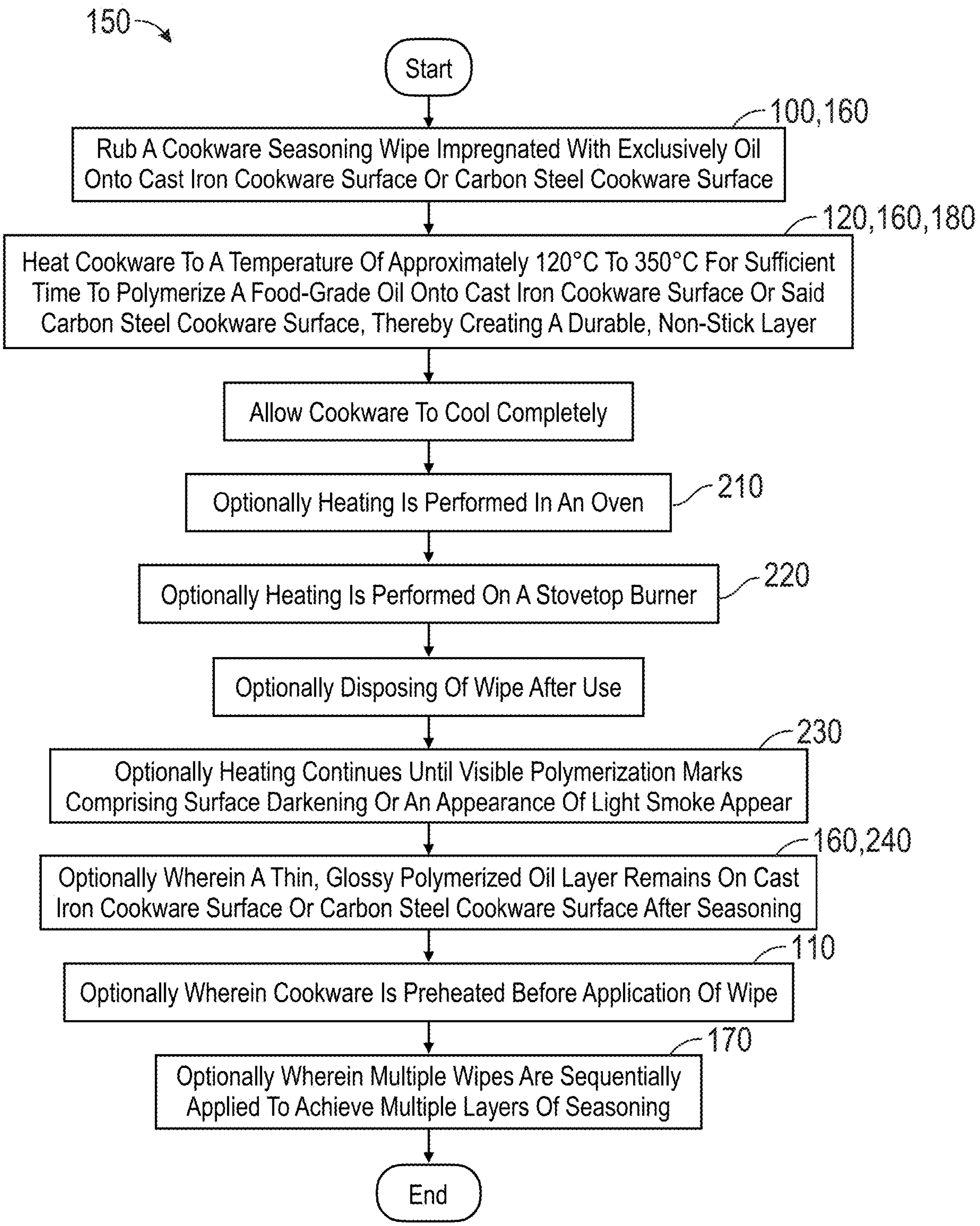
FIG. 4 is a flowchart of the method of using the oil-impregnated wipe and method for seasoning cast iron and carbon steel cookware according to the invention.

Referring to the Figures, there is shown in FIGS. 1, 2, 3, and 4 the following features:

Element 100 which is a cookware seasoning wipe.

Element 110 which is a wipe.

Element 120 which is a food-grade oil.

Element 130 which is an essential oil for scent.

Element 140 which is a substrate of the wipe.

Element 150 which is a method for seasoning a cast iron cookware surface or a carbon steel cookware surface of a cookware.

Element 160 which is a cast iron cookware surface or a carbon steel cookware surface.

Element 170 which is a cookware.

Element 180 which is a durable, non-stick layer.

Element 190 which is an air-tight, single-use container.

Element 210 which is an oven.

Element 220 which is a stovetop burner.

Element 230 which is a surface darkening or an appearance of light smoke.

Element 240 which is a thin, glossy polymerized oil layer.

Element 250 which is a blend of said food-grade oil.

Element 260 which is a structured surface texture.

Element 270 which is an indicator element.

To make the cookware seasoning wipe, begin by selecting a suitable base material for the wipe. The wipe may be composed of natural fibers such as cotton or cellulose, or synthetic fibers such as polyester or a blend thereof. The chosen material should be durable enough to withstand mechanical application onto cookware surfaces and capable of absorbing and retaining food-grade oil. The surface area of each wipe should be at least eight square centimeters to provide sufficient coverage during use.

Once the wipe substrate is selected, the food-grade oil is prepared. The oil can be any of flaxseed, canola, grapeseed, soybean, avocado, or sunflower oil, selected based on polymerization properties and user preference. Essential oils such as lavender, rosemary, citrus, or lemongrass may optionally be added for aromatic enhancement.

The oil is impregnated into the wipe using a uniform distribution technique. This may be achieved by soaking, spraying, or vacuum impregnation, depending on the production scale and desired consistency. Vacuum impregnation ensures deep saturation and retention of the oil. The oil content may range from 5% to 99% by weight, depending on the thickness and absorption properties of the wipe material.

In one embodiment, the oil is microencapsulated prior to impregnation. Microencapsulation enables the oil to remain dormant until activated by heat or pressure during use. This may be accomplished using food-safe encapsulation agents and standard industrial techniques.

For packaging, each wipe is sealed in an air-tight, single-use container to preserve oil integrity and prevent leakage or oxidation. The container may be foil-lined or made of other barrier materials to maintain freshness and shelf life.

Optionally, the wipe surface can be textured or embossed to facilitate even oil distribution across cookware. Surface texture designs should optimize both contact area and spreading efficiency without damaging cookware.

The wipe may also incorporate an indicator element such as a temperature-sensitive ink or material that changes color or texture when the oil is fully released or activated by heat. This feedback allows users to confirm proper application and use.

To use the wipe, remove it from its sealed container and rub it directly onto the surface of clean, dry cast iron or carbon steel cookware. Ensure complete surface coverage with a thin, even layer of oil.

Following application, heat the cookware using either an oven or stovetop burner to a temperature between 120° C. and 350° C. Heating causes the food-grade oil to polymerize and bond to the cookware surface, forming a durable, non-stick coating. Continue heating until signs of polymerization such as light smoking or surface darkening appear.

Allow the cookware to cool completely before handling or reusing. The wipe can then be discarded; if the wipe is biodegradable or recyclable, dispose of it accordingly.

For enhanced results, the seasoning process may be repeated multiple times using additional wipes. Preheating the cookware before wiping may also improve oil adhesion and polymerization efficiency. Multiple layers may be built up to achieve greater durability and performance.

The method and product may be used for regular maintenance of cookware or for initial seasoning of new cookware surfaces. The simplicity and portability of the wipe format make it ideal for home cooks, professionals, and outdoor or travel use alike.

Each element of the invention—from the composition of the wipe, to the selection and distribution of oil, to the method of use—contributes to reliable, convenient, and easy-to-use cookware seasoning.

Various options may be implemented in the construction and formulation of the cookware seasoning wipe to accommodate different user needs and manufacturing preferences. For example, the wipe material may be selected for its biodegradability, compostability, or recyclability. Natural fibers such as bamboo or hemp may be employed for an eco-friendly, disposable solution, while synthetic blends may offer increased durability and shelf life.

The oil formulation may be tailored to specific cookware types or user preferences. For instance, flaxseed oil, known for its high polymerization rate, may be favored for initial seasoning, while avocado oil or canola oil may be better suited for maintenance applications due to their higher smoke points and neutral flavors.

The wipe may be offered in various sizes to accommodate small skillets or large griddles. A standard size may be established (e.g., 10 cm×10 cm), while larger formats may be folded or pre-perforated for ease of use.

Scented versions of the wipe may be provided using food-safe essential oils. These may include lavender, rosemary, citrus, or lemongrass, chosen for their pleasing aromatic profiles and thermal stability. Unscented versions may be offered for users with sensitivities or for professional kitchen use.

The wipe may also include surface textures or structural features such as embossed ridges, dimples, or patterned fibers to enhance oil distribution and surface contact. These textural modifications help evenly coat cookware surfaces without over-saturation.

For user convenience, the wipe may be color-coded or marked to indicate oil type or recommended use (e.g., initial seasoning vs. maintenance). Clear visual cues help users select the right product for the task.

Packaging may include multi-wipe packs, resealable pouches, or single-use foil packets. Multi-pack formats support cost-efficiency and extended use, while single-use packets optimize freshness and portability.

A temperature-indicating dye or heat-sensitive element integrated into the wipe or its packaging may signal the ideal seasoning temperature has been reached. This provides novice users with greater confidence in the seasoning process.

The present invention provides numerous advantages over conventional cookware seasoning methods. It eliminates the need for messy manual oil application and inconsistent layering, enabling a clean, controlled, and repeatable process. By delivering a pre-measured, ready-to-use solution, the wipe simplifies seasoning for beginners and experienced users alike.

The invention promotes uniform polymerization through even oil distribution and optimal heating ranges. It reduces the risk of over- or under-applying oil and minimizes sticky residues often associated with excess oil or improper application.

Its sealed, portable format allows for convenient storage, transport, and single-use reliability. It is particularly beneficial for outdoor use, travel cooking, or situations where traditional oil and applicator methods are impractical.

The use of food-safe oils and the exclusion of waxes or chemical additives ensures the safety and purity of the seasoning layer. Optional essential oils add pleasant aromatics without compromising safety or performance.

Environmentally friendly wipe materials and disposal options support sustainability and minimize waste. Compostable or recyclable options align with consumer preferences for eco-conscious products.

Overall, the invention combines convenience, efficiency, safety, and sustainability into a single, practical solution for seasoning cast iron and carbon steel cookware, resolving longstanding problems with traditional seasoning methods and improving the overall user experience.

In a preferred embodiment of the present invention there is a cookware seasoning wipe consisting essentially of a wipe composed of natural or synthetic fibers with a surface area of at least eight square centimeters. The wipe is impregnated exclusively with a food-grade oil, optionally combined with essential oils for scent, and is free from wax or wax derivatives. The food-grade oil is distributed throughout the wipe or across a substrate of the wipe. This wipe is specifically configured for seasoning cast iron or carbon steel cookware surfaces by polymerization of the oil onto the surfaces when heated between approximately 120° C. and 350° C.

In an alternate embodiment of the present invention there is a cookware seasoning wipe wherein the food-grade oil is selected from flaxseed, canola, grapeseed, soybean, avocado, or sunflower oil. These oils are chosen for their polymerization properties, thermal stability, and food safety.

In an alternate embodiment of the present invention there is a cookware seasoning wipe wherein the wipe is biodegradable or compostable. Materials such as bamboo, cotton, or cellulose-based fabrics may be used to enhance environmental sustainability.

In an alternate embodiment of the present invention there is a cookware seasoning wipe further comprising an essential oil selected from lavender, rosemary, citrus, or lemongrass essential oil for aromatic purposes. These oils may enhance the user experience with a pleasant scent during the seasoning process.

In an alternate embodiment of the present invention there is a cookware seasoning wipe wherein the food-grade oil constitutes between 5% and 99% by weight of the wipe. This range allows flexibility in oil saturation depending on the wipe's size and absorption characteristics.

In an alternate embodiment of the present invention there is a cookware seasoning wipe wherein the wipe is sealed in an air-tight, single-use container. Such packaging preserves oil freshness and prevents leakage or contamination.

In an alternate embodiment of the present invention there is a cookware seasoning wipe wherein the oil is microencapsulated and releases upon application of heat or pressure. This feature allows for controlled release and enhanced storage life.

In an alternate embodiment of the present invention there is a cookware seasoning wipe wherein the impregnation is performed using a vacuum impregnation technique, ensuring deep and uniform oil distribution throughout the wipe.

In an alternate embodiment of the present invention there is a cookware seasoning wipe wherein the wipe is recyclable, made from synthetic or blended materials compatible with recycling programs.

In an alternate embodiment of the present invention there is a cookware seasoning wipe wherein the oil blend is specifically tailored for seasoning carbon steel cookware, optimizing performance for that material.

In an alternate embodiment of the present invention there is a cookware seasoning wipe wherein the wipe has a structured surface texture designed to evenly distribute oil onto cookware surfaces. Surface embossing, ridging, or patterning may be used to enhance spreadability.

In an alternate embodiment of the present invention there is a cookware seasoning wipe wherein the wipe has an indicator element that visually signals complete oil release upon heating. This may include a color change or visible mark to guide the user.

In a preferred embodiment of the present invention there is a method for seasoning cast iron or carbon steel cookware surfaces comprising rubbing the cookware seasoning wipe onto the cookware surface, heating the cookware to a temperature of approximately 120° C. to 350° C. for sufficient time to polymerize the food-grade oil onto the surface, and allowing the cookware to cool completely. The process utilizes exclusively oil-impregnated wipes without wax or wax derivatives.

In an alternate embodiment of the present invention there is a method wherein heating is performed in an oven, offering even temperature control and convenience.

In an alternate embodiment of the present invention there is a method wherein heating is performed on a stovetop burner, suitable for quick application and localized seasoning.

In an alternate embodiment of the present invention there is a method further comprising disposing of the wipe after use. If the wipe is biodegradable or recyclable, appropriate disposal practices may be followed.

In an alternate embodiment of the present invention there is a method wherein heating continues until visible polymerization marks comprising surface darkening or an appearance of light smoke appear. These signs serve as confirmation of proper seasoning.

In an alternate embodiment of the present invention there is a method wherein a thin, glossy polymerized oil layer remains on the cookware surface after seasoning. This coating enhances non-stick properties and corrosion resistance.

In an alternate embodiment of the present invention there is a method wherein the cookware is preheated before application of the wipe, enhancing oil adhesion and facilitating uniform polymerization.

In an alternate embodiment of the present invention there is a method wherein multiple wipes are sequentially applied to achieve multiple layers of seasoning. This layering technique increases durability and long-term cookware performance.

The present invention provides expanded advantages in both function and user experience. It streamlines the cookware seasoning process by offering a pre-measured, ready-to-use wipe, eliminating common problems of excess oil and uneven application associated with traditional methods.

The use of food-safe, natural oils without waxes or chemical additives ensures safe, effective seasoning without health concerns. Optional features such as aromatic essential oils, texturized surfaces, and visual indicators further improve usability.

Environmental sustainability is enhanced through biodegradable, compostable, or recyclable wipe options. Single-use packaging minimizes contamination while preserving freshness, and multiple wipe formats suit various cookware sizes and seasoning needs.

Whether used in home kitchens, restaurants, or outdoor cooking settings, the invention offers reliability, consistency, and portability. Its adaptability across cookware types and user preferences makes it an indispensable tool for effective cookware maintenance.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A cookware seasoning wipe consisting essentially of:

a wipe composed of natural or synthetic fibers with a surface area of at least eight square centimeters;

impregnated exclusively with a food-grade oil, optionally combined with an essential oil for scent, and free from wax or wax derivatives, wherein said food-grade oil is distributed throughout said wipe or across a substrate of said wipe;

wherein said wipe is configured specifically for seasoning cast iron or carbon steel cookware surfaces by polymerization of said food-grade oil onto said surfaces when heated between 120° C. and 350° C.

2. A method for seasoning a cast iron cookware surface or a carbon steel cookware surface of a cookware comprising:

rubbing a cookware seasoning wipe according to claim 1 onto said cast iron cookware surface or said carbon steel cookware surface;

heating said cookware to a temperature of 120° C. to 350° C. for sufficient time to polymerize a food-grade oil onto said cast iron cookware surface or said carbon steel cookware surface, thereby creating a durable, non-stick layer; and allowing said cookware to cool completely;

wherein said method utilizes exclusively oil impregnated wipes without wax or wax derivatives.

3. The method of claim 2, wherein heating is performed in an oven.

4. The method of claim 2, wherein heating is performed on a stovetop burner.

5. The method of claim 2, further comprising disposing of said wipe after use.

6. The method of claim 2, wherein heating continues until visible polymerization marks comprising surface darkening or an appearance of light smoke appear.

7. The method of claim 2, wherein a thin, glossy polymerized oil layer remains on said cast iron cookware surface or said carbon steel cookware surface after seasoning.

8. The method of claim 2, wherein said cookware is preheated before application of said wipe.

9. The method of claim 2, wherein multiple wipes are sequentially applied to achieve multiple layers of seasoning.

10. The cookware seasoning wipe of claim 1, wherein said food-grade oil is selected from a flaxseed oil, a canola oil, a grapeseed oil, soybean, an avocado oil, or a sunflower oil.

11. The cookware seasoning wipe of claim 1, wherein said wipe is biodegradable or compostable.

12. The cookware seasoning wipe of claim 1, wherein said essential oil selected from a lavender essential oil, a essential rosemary oil, a citrus essential oil, or a lemongrass essential oil for aromatic purposes.

13. The cookware seasoning wipe of claim 1, wherein said food-grade oil constitutes between 5% and 99% by weight of said wipe.

14. The cookware seasoning wipe of claim 1, wherein said wipe is sealed in an air-tight, single-use container.

15. The cookware seasoning wipe of claim 1, wherein said food-grade oil is micro-encapsulated and releases upon application of heat or pressure.

16. The cookware seasoning wipe of claim 1, wherein impregnating said food-grade oil is performed using a vacuum impregnation technique.

17. The cookware seasoning wipe of claim 1, wherein said wipe is recyclable.

18. The cookware seasoning wipe of claim 1, wherein a blend of said food-grade oil, optionally combined with said essential oil, is specifically tailored for seasoning carbon steel cookware.

19. The cookware seasoning wipe of claim 1, wherein said wipe has a structured surface texture designed to evenly distribute said food-grade oil, optionally combined with said essential oil, onto said cast iron cookware surface or said carbon steel cookware surface.

20. The cookware seasoning wipe of claim 1, wherein said cookware seasoning wipe has an indicator element that visually signals complete oil release upon heating.

* * * * *